No. 666,175.  
B. C. BATCHELLER.  
PIPE COUPLING.  
(Application filed Mar. 21, 1899.)  
(No Model.)
Patented Jan. 15, 1901.
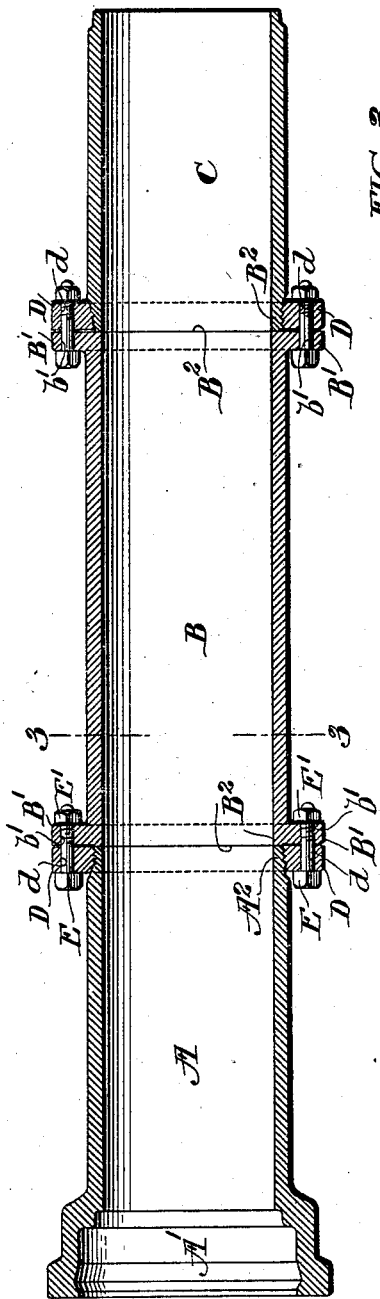
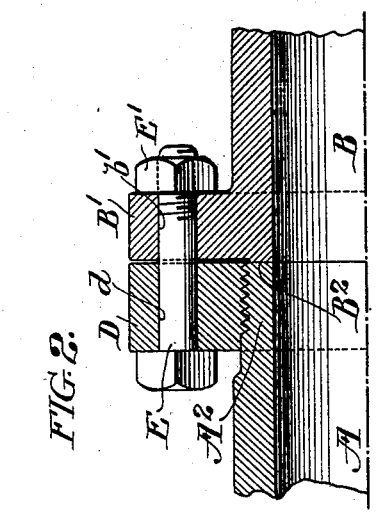
WITNESSES·  
INVENTOR·

UNITED STATES PATENT OFFICE.

BIRNEY C. BATCHELLER, OF PHILADELPHIA, PENNSYLVANIA.

PIPE-COUPLING.

SPECIFICATION forming part of Letters Patent No. 666,175, dated January 15, 1901.

Application filed March 21, 1899. Serial No. 709,895. (No model.)

*To all whom it may concern:*

Be it known that I, BIRNEY C. BATCHELLER, a citizen of the United States of America, residing in the city and county of Philadelphia, in the State of Pennsylvania, have invented a certain new and useful Improvement in Pipe-Couplings, of which the following is a true and exact description, reference being had to the accompanying drawings, which form a part thereof.

My invention relates to the coupling together of pipe-sections, and is especially designed to serve as a repair-coupling to take the place of a pipe-section removed from a pipe-line in position, my object being particularly to provide a coupling-section which can be inserted to complete the line without disturbing the sections in place and to be united.

While my invention is applicable to many kinds of pipe-lines, it has been designed with particular reference to pipe-lines used for the pneumatic transmission of packages and which are usually made of cast-iron pipe-sections with bell and spigot joints.

Reference being now had to the drawings illustrating my invention, Figure 1 is a longitudinal section through a coupling device embodying my invention. Fig. 2 is an enlarged view of the joint formed between an outer and the inner section of the coupling, and Fig. 3 is a cross-section on line 3 3 of Fig. 1.

A and C are the outer or end sections of my coupling, the outer ends of each being formed to couple with the ordinary pipe-sections in use in the line. Thus section A has an outer bowl end A', adapted to form a joint with the socket end of a pipe, and section C has an outer end C', adapted to form a joint with the bell end of a pipe. The inner ends of the sections A and C are formed or provided with annular outwardly-extending flanges D, and by preference I form the inner ends of the sections A and C with a screw-thread, as indicated at $A^2$ and $B^2$, and screw-threaded rings D upon them, as shown, to form the flanges.

B is the intermediate section of the coupling and is formed or provided with annular outwardly-extending flanges B' B' at both ends, as shown, and preferably this intermediate section has its extreme ends $B^2$ extending slightly beyond the annular flanges, as shown.

In use my coupling takes the place of a pipe-section which has been broken to give access to the pipe-line and is applied by first coupling the end sections A and C to the ends of the pipe-sections in place in the line, and then inserting between said end sections the intermediate section B and securing it to the end sections by means of the abutted flanges B' D. This coupling of the flanges may be effected in any convenient way; but by preference I form the flanges D with bolt-holes $d$, and the flanges B' with similarly-arranged bolt-holes $b'$ and secure them together by bolts E, passing through said holes, and nuts E', screwing on the bolts, as shown.

Having now described my invention, what I claim as new, and desire to secure by Letters Patent, is—

1. A pipe-line-repair coupling consisting of two end sections A and C, the outer ends of which are adapted to couple with the ordinary pipe lengths forming the line and the inner ends of which are not adapted to be so connected, but are provided with annular outwardly-extending flanges, as D, an intermediate section B having at both ends annular outwardly-extending flanges B' and means for securing the flanges D and B' together.

2. A pipe-line-repair coupling consisting of two end sections A and C the outer ends of which are adapted to couple with the ordinary pipe lengths forming the line and the inner ends of which are not adapted to be so connected, but are screw-threaded and provided with annular-flange rings D adapted to screw on the threaded inner ends of said end sections and form outwardly-extending flanges thereon, an intermediate section B having outwardly-extending annular flanges B' on its ends and means for securing flanges D and B' together.

3. A pipe-line-repair coupling consisting of two end sections A and C the outer ends of which are adapted to couple with the ordinary pipe lengths forming the line and the inner ends of which are not adapted to be so connected, but are provided with annular outwardly-extending flanges, as D, formed with a series of transverse bolt-holes, as $d$, an intermediate section B having at both ends annular outwardly-extending flanges B', formed with a series of transverse bolt-holes $b'$ corresponding in position with the bolt-holes $d$ and a series of bolts and nuts E E' the bolts passing through the holes in the flanges and securing the outer and inner sections together.

BIRNEY C. BATCHELLER.

Witnesses:
CHAS. F. MYERS,
D. STEWART.